United States Patent
Holt, II et al.

(10) Patent No.: US 10,231,381 B2
(45) Date of Patent: Mar. 19, 2019

(54) PNEUMATIC GRAIN LEVEL SENSOR AND METHOD THEREFORE

(71) Applicant: CNH Industrial America LLC, New Holland, PA (US)

(72) Inventors: Edmund N. Holt, II, Denver, PA (US); Michael A. Conrad, Lititz, PA (US); Jonathan E. Ricketts, Coal Valley, IL (US); Bart M. A. Missotten, Herent (BE)

(73) Assignee: CNH Industrial America LLC, New Holland, PA (US)

( * ) Notice: Subject to any disclaimer, the term of this patent is extended or adjusted under 35 U.S.C. 154(b) by 16 days.

(21) Appl. No.: 15/298,066

(22) Filed: Oct. 19, 2016

(65) Prior Publication Data

US 2017/0112062 A1    Apr. 27, 2017

Related U.S. Application Data

(60) Provisional application No. 62/245,733, filed on Oct. 23, 2015.

(51) Int. Cl.
| | | |
|---|---|---|
| *A01D 41/127* | (2006.01) | |
| *A01D 41/12* | (2006.01) | |
| *G01F 23/18* | (2006.01) | |

(52) U.S. Cl.
CPC ..... *A01D 41/1275* (2013.01); *A01D 41/1208* (2013.01); *G01F 23/18* (2013.01)

(58) Field of Classification Search
CPC . A01D 41/1275; A01D 41/1208; A01F 12/60; G01F 23/14; G01F 23/16; G01F 23/161; G01F 23/18

USPC .................................................... 73/290 R
See application file for complete search history.

(56) References Cited

U.S. PATENT DOCUMENTS

| | | | | |
|---|---|---|---|---|
| 2,696,606 A | * | 12/1954 | De La Pomelie | G01F 23/18 110/189 |
| 3,290,938 A | * | 12/1966 | Miller | G01F 23/16 73/290 R |
| 3,401,562 A | * | 9/1968 | Reaney | G01F 23/16 73/290 R |
| 3,459,035 A | * | 8/1969 | Russon | G01F 23/161 73/290 R |
| 3,632,019 A | * | 1/1972 | Harm | G01F 23/185 141/198 |
| 3,734,313 A | * | 5/1973 | Gauthier | B65G 47/00 200/61.21 |

(Continued)

FOREIGN PATENT DOCUMENTS

| | | |
|---|---|---|
| DE | 1929236 A1 | 12/1970 |
| DE | 2419785 A1 | 11/1975 |

*Primary Examiner* — Robert E Pezzuto
*Assistant Examiner* — Adam J Behrens
(74) *Attorney, Agent, or Firm* — Patrick M. Sheldrake; Peter K. Zacharias

(57) ABSTRACT

A combine including a frame, power unit and a crop gathering and processing device. A grain tank is mounted on the frame. An elongated closed end tube is vertically oriented within the grain tank and has a plurality of uniformly spaced openings along its length. A pneumatic pump pressurizes the interior of the tube. A pressure sensor senses the interior pressure of the elongated tube, so that grain building up therein selectively covers the plurality of openings to cause a proportionate increase in air pressure.

20 Claims, 3 Drawing Sheets

(56) References Cited

U.S. PATENT DOCUMENTS

| | | | |
|---|---|---|---|
| 3,994,169 A | 11/1976 | Wolford | |
| 4,241,606 A * | 12/1980 | Vandenhoeck | G01F 23/14 73/290 R |
| 4,527,714 A * | 7/1985 | Bowman | G01F 23/14 222/56 |
| 5,325,716 A | 7/1994 | Haefner et al. | |
| 5,526,683 A | 6/1996 | Maggio | |
| 7,228,736 B2 * | 6/2007 | Smith | G01F 23/185 141/95 |
| 8,981,949 B2 * | 3/2015 | Ricketts | A01D 41/1275 340/540 |

* cited by examiner

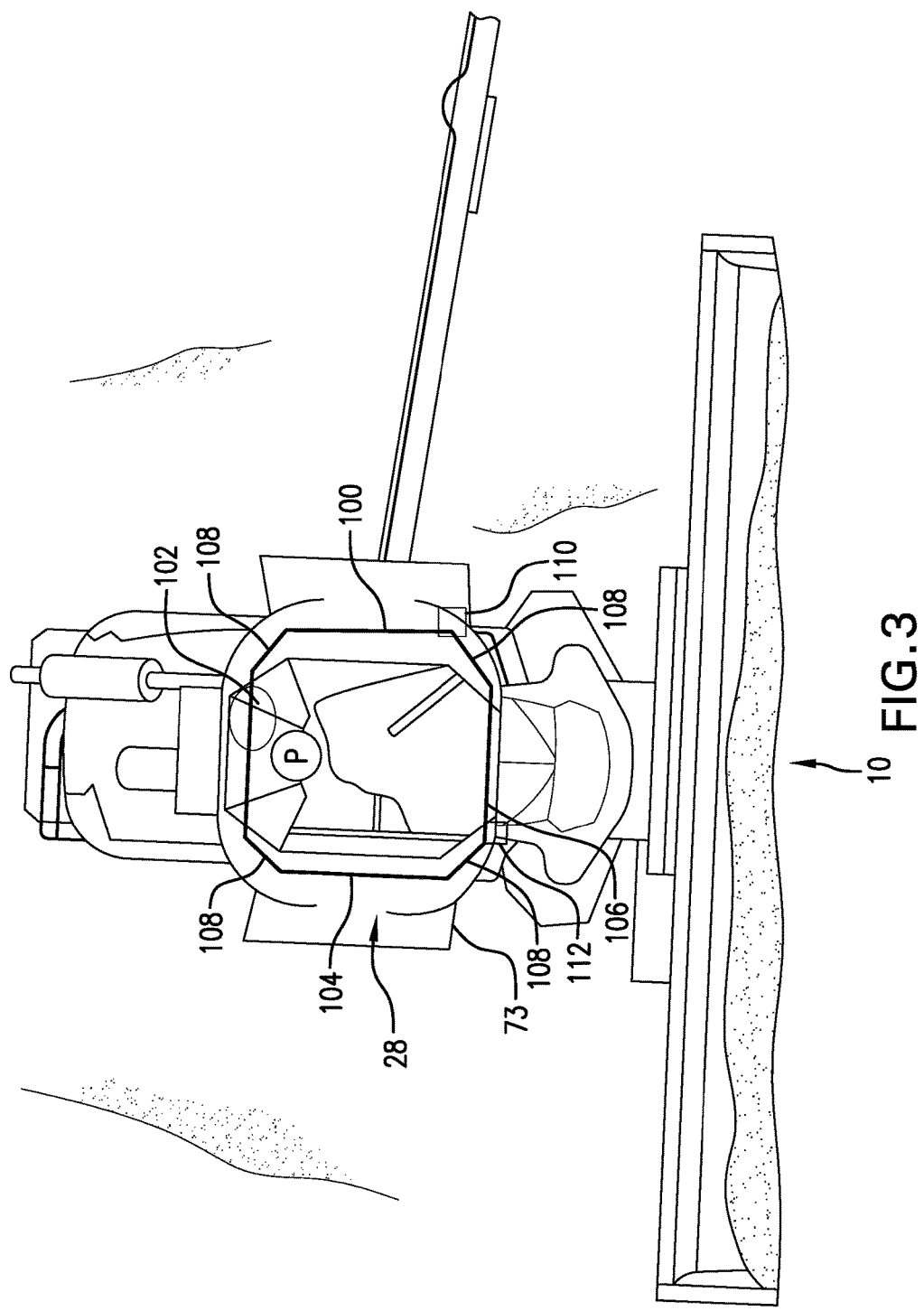

PNEUMATIC GRAIN LEVEL SENSOR AND METHOD THEREFORE

This application claims the benefit of U.S. Provisional Patent Application No. 62/245,733, entitled "Pneumatic Grain Level Sensor and Method Therefore" and filed Oct. 23, 2015, the contents of which are incorporated herein by reference.

BACKGROUND OF THE INVENTION

1. Field of the Invention

The present invention relates to agricultural machinery, and, more particularly, for apparatus and methods for determining the level of grain within a grain tank.

2. Description of the Related Art

As the agricultural technology is evolving there is an ever increasing drive towards efficiency. This drive for efficiency is apparent in the use of agricultural combines to harvest even greater quantities of grain or crop material for a given pass through the field. The combine harvests, collects and processes the crop to extract the grain which is placed in a grain tank for accumulation until it is full at which point it is discharged into another vehicle for transport from the field. It becomes important to have 1) a reliable means of determining the level of grain within a tank so that delivery to a transport vehicle only takes place when the grain tank is full and 2) means to determine the exact level, and, by association, the rate the grain tank is filling so that the time to fill can be predicted.

This has prompted a number of approaches to determine fullness within the tank. An early approach was a window giving a visual indication to the operator when the tank is nearly full. However, this posed a distraction to the operator who is called on to operate a large and increasingly complex piece of machinery. Other approaches have been to have pressure level switches at various locations within the tank to provide an indication when the tank is, for example, ¾ full and then full. Other devices using ultrasonic or radar detectors have been proposed. While these do provide a means of determining the fullness within the grain tank, they do so at increased cost and complexity.

Accordingly, what is needed in the art is a simplified and effective way to continuously measure the increase in quantity of grain within a grain tank.

SUMMARY OF THE INVENTION

The present invention seeks to continuously determine the level of grain within a combine grain tank, expandable to mobile gain carts, semi-trailers, grain storage silos, grain storage elevators, using a minimum of sensors.

In one form, the invention is a grain level sensor for a grain tank. The sensor includes an elongated closed end tube positioned within the tank and having a plurality of spaced openings along its length. A pneumatic pump pressurizes the interior of the tube and a pressure sensor is provided for sensing the interior pressure. The elongated tube is oriented relative to the grain tank so that grain building up therein selectively covers the plurality of openings to cause an increase in sensed pressure.

In another form, the invention is a combine including a frame, power unit and a crop gathering and processing device. A grain tank is mounted on the frame and a conveyor delivers grain to the grain tank from the crop gathering and processing device. An elongated closed end tube is positioned within the grain tank and has a plurality of spaced openings along its length. A pneumatic pump pressurizes the interior of the tube. A pressure sensor senses the interior pressure of the elongated tube, the elongated tube being oriented relative to the grain tank so that grain building up therein selectively covers the plurality of openings to cause an increase in air pressure.

In yet another form, the invention is a method for determining the level of a grain in a tank. The method includes the steps of placing into the tank a closed end elongated tube having a plurality of spaced openings along its length and pressurizing the interior of the tube to a given level. The interior pressure of the tube is sensed without grain in the tank. Subsequently the interior pressure of the tube is sensed as the grain accumulates within the tank. The subsequent pressure is compared to the empty pressure as a measure of the grain within the tank.

One benefit of the invention is the provision of a continuous measurement of the quantity of grain within a tank using essentially a single sensor.

Another benefit is adding a minimum of hardware to an agricultural combine while having a continuous quantity measurement.

Another benefit is that the sensing hardware is contained entirely within the grain tank, minimizing the chance of damage from physical contact with trees or structures.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
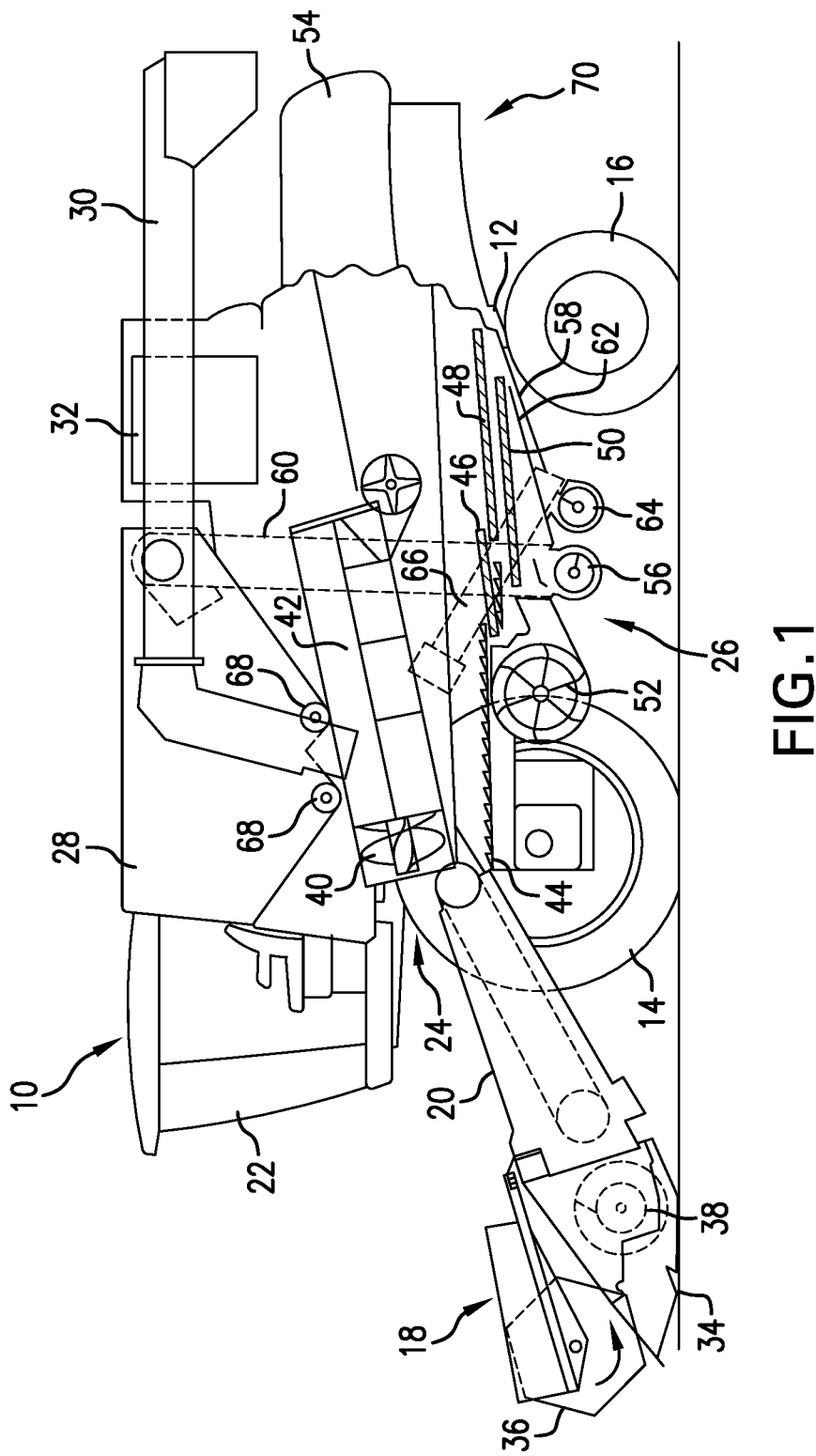
FIG. 1 is a side view of an embodiment of a combine with which the present invention may be utilized.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a grain cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or halftracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the rotor 40 and perforated concaves 42 falls onto a main grain pan 44 and is conveyed toward grain cleaning system 26. Grain cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Main grain pan 44 and pre-cleaning sieve 46 oscillate or reciprocate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of grain cleaning system 26. Clean grain auger 56 conveys the clean grain laterally to a generally vertically arranged elevator 60, which can also be referred to as a grain elevator, for transport to grain tank 28. Tailings from grain cleaning system 26 fall to a tailings auger on 62. The tailings are transported via tailings auger 64 and return auger 66 to the upstream end of grain cleaning system 26 for repeated cleaning action. A pair of grain tank augers 68 at the bottom of grain tank 28 conveys the clean grain laterally within grain tank 28 to unloading auger 30 for discharge from combine 10. The non-grain crop material proceeds through a residue handling system 70. Residue handling system 70 may include a chopper, counter knives, a windrow door and a residue spreader.

In the course of harvesting grain, it becomes important for the operator to ascertain the quantity of grain accumulating within grain tank 28. The embodiments of the present invention illustrated in FIGS. 1 and 2 achieve this with a simplified arrangement of components.

Figure 2:
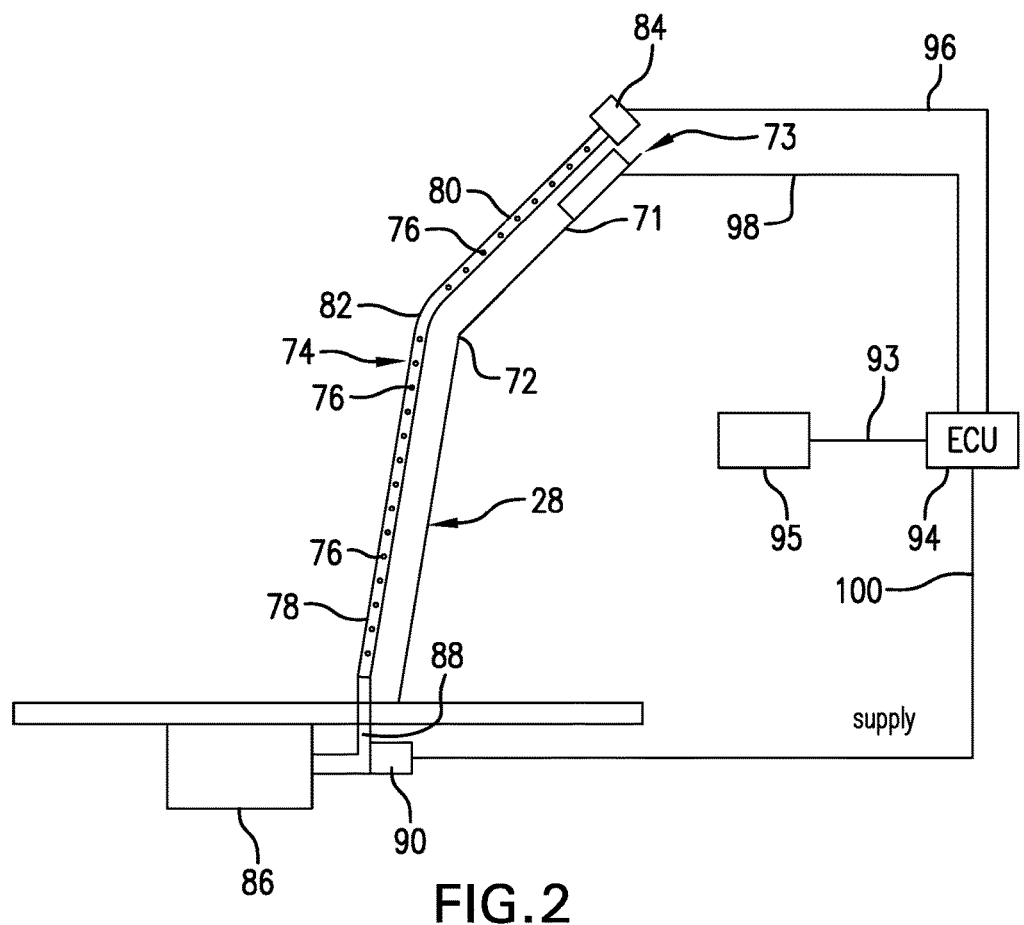
FIG. 2 is a partial cross section view of the combine of FIG. 1 showing one embodiment of the present invention; and, FIG. 3 is a plan view of the combine of FIG. 1 showing another embodiment of the present invention.

Referring now to the drawings, and more particularly to FIG. 2, the grain tank 28 has an extension wall 71 at least along a portion of its periphery and is hinged to grain tank 28 by a hinge 72. An upper open periphery 73 defines the top of the grain tank 28 and extension 71. A perforated tube 74 extends vertically from the bottom of grain tank 28 to its upper most reaches. Tube 74 has a plurality of openings 76 uniformly spaced along its length. The size of the openings 76 is sufficiently small to be smaller than the minimum expected size of the grain anticipated to be housed within grain tank 28. Another embodiment could be where the size of the openings 76 is larger than the minimum expected size of the grain anticipated to be housed within grain tank 28 and guarded by fabric or screen having appropriate porosity. The tube 74 has a first section 78 in grain tank 78 and a second section 80 secured to grain tank extension 71. The first and second section 78 and 80 are connected fluidly through a flexible joint 82 such as a flexible tube.

A pressure sensor 84 is positioned at the upper end of perforated tube 74, thus closing off one end of the tube. A pneumatic pressure supply 86 closes off the opposite end of perforated tube 74. The pneumatic pressure supply 86 may be a tap into the pneumatic pressure supply of the combine 10 or it may be a separately dedicated pneumatic pump and motor. The output of pneumatic pressure supply 86 is coupled to perforated tube 74 by an outlet tube 88. A pressure sensor 90 generates a signal reflecting the supply pressure from pneumatic pressure supply 86. A switch level 92, near the upper open periphery 73, generates a signal reflecting a full grain tank 28 including the extension 71. Switch 92 may be of the contact type which changes state when contacted or covered by grain. The signals from the various sensors are sent to an electronic control unit 94 ECU by a line 96 leading from pressure sensor 84, line 98 leading from switch level 92 and line 100 leading from supply pressure sensor 90.

The pressure with the closed end perforated tube 74, when the tank is empty, reflects a pressure level that is at its lowest and is set by the supply pressure from the pneumatic pressure supply 86, the size and number of holes 76. As the grain tank 28 and extension 71 are filled, more of the openings 76 are closed off thus restricting the outflow of air from the perforated tube 74 and in turn increasing the pressure sensed by pressure sensor 84. The pressure continues to increase in generally a proportional manner until the switch level 92 signals that the grain tank 28 is full. At this point, the pressure indicated by sensor 84 is that for a full tank and substantially closed off perforated tube 74. This signal is computed by the ECU 94 to be the full pressure signal and any signal below that is in proportion to the quantity of grain within the tank 28 and extensions 20. The pressure sensor 90 provides an input to ECU 94 that is useful when the pneumatic pressure supply 86 varies. The overall proportion and absolute pressure increases are adjusted according to the variation in pressure of the pneumatic pressure supply 86. The signal reflecting the changes in pressure is indicated on component 95 connected to ECU by line 93. Component 95 may be calibrated in terms of percentage of grain in the tank or in any other convenient parameter such as time to fill, distance to full, area (acres) to full.

The arrangement set forth above offers a precise and continuous measurement of the quantity of grain within the grain tank 28 and the extension 71 with a minimum of sensors. Unlike the prior art devices having multiple contact sensors or non-contact electronic sensors, it provides continuous measurement with straight forward and inexpensive components. In addition, the elements making up the system are robust and relatively unaffected by the otherwise contaminated environment of the combine 10.

The arrangement shown in FIG. 2 senses the continuous change in level of the grain within tank 28 and extension 71. The principle used in FIG. 1 may be used also in the arrangement shown in FIG. 3 which shows a full grain pneumatic sensor. As such, this arrangement may be used in parallel with the components shown in FIG. 2. Specifically referring to FIG. 3, the upper open periphery 73 of grain tank 28, including extensions 71, has a plurality of perforated tubes 100, 102, 104 and 106 interconnected by flexible connecting tubes 108. A pressure sensor 110 is provided to sense the pressure within the closed end tube made up by the individual tubes 100 to 106. A pneumatic pressure supply 112 supplies pneumatic pressure to the interior of the tube as is the case with the arrangement of FIG. 1.

As illustrated, the tubes may be interconnected to form a continuous closed end perforated tube or they may be individual tubes. In either case, as the grain fills the tank, the pressure sensed by sensor 110 remains at its' lowest until one of the legs of tubes is covered with grain at which point the pressure is increased from the earlier lowest pressure. As a result, the tubes sense when grain tank 28 is full, even when the combine 10 is on a slope and one side of the perforated tubes is covered before the others. This enables the operator to determine that the tank is full and needs emptying before it spills out over the low side. The arrangement of FIG. 3 shows a simplified way of determining a full grain tank even when the combine is operating on a slope.

In both configurations, the quantity of grain or the fullness of the tank are determined with readily obtainable inexpensive and durable sensors that operate reliably within the agricultural combine environment.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A grain level sensor for a grain tank, said sensor comprising:
   an elongated closed end tube positioned within the tank and having a plurality of openings along its length of said elongated closed end tube;
   a pneumatic pump for pressurizing the interior of said tube;
   at least one pressure sensor for sensing the interior pressure of said elongated tube, said elongated tube being oriented relative to said grain tank so that grain building up therein selectively covers said plurality of openings to cause an increase of sensed pressure.

2. The sensor as claimed in claim 1, wherein the tube is oriented in a vertical direction so that accumulating grain covers the openings in said tube starting adjacent the lowest point thereof.

3. The sensor as claimed in claim 1, wherein the said holes have a size that is one of smaller than the expected grain particle size and larger holes guarded by one of fabric and screen with appropriate porosity.

4. The sensor as claimed in claim 1, further comprising a full level switch adjacent the top of the grain tank.

5. The sensor as claimed in claim 4, wherein said full level switch is of a contact type changing state when covered by grain.

6. The sensor as claimed in claim 1, further comprising a sensor for sensing the pressure output of said pneumatic pump.

7. The sensor as claimed in claim 1, wherein the grain tank has an upper open periphery and said tube is oriented in a horizontal direction relative to said grain tank and near the upper open periphery for sensing when the grain tank is full.

8. The sensor as claimed in claim 7, having a plurality of tubes positioned around the upper open periphery of said tank.

9. A combine comprising:
   a frame;
   a power unit;
   a crop gathering and processing device;
   a grain tank having an upper open periphery;
   a conveyor delivering grain to said grain tank from said crop gathering and processing device;
   an elongated closed end tube positioned within the grain tank and having a plurality of space openings along a length of said elongated closed end tube;
   a pneumatic pump for pressurizing the interior of said tube; and
   a pressure sensor for sensing the interior pressure of said elongated tube, said elongated tube being oriented relative to said grain tank so that grain building up therein selectively covers said plurality of openings to cause an increase in air pressure.

10. The combine as claimed in claim 9, wherein said tube is positioned in a vertical direction.

11. The combine as claimed in claim 9, wherein the openings in said tube are one of a size smaller than the expected size of the grain accumulating in said grain tank and a size larger than the expected size of the grain accumulation in said grain tank, but guarded by one of fabric and screen.

12. The combine as claimed in claim 9, further comprising a full level switch adjacent the upper open periphery for indicating when the grain tank is full.

13. The combine as claimed in claim 12, wherein the full level switch is a contact type switch changing state when covered by grain.

14. The combine as claimed in claim 9, further comprising a sensor for sensing the pressure output of said pneumatic pump.

15. The combine as claimed in claim 10, wherein the grain tank has a plurality of walls at least some of which are hinged to permit the upper walls near the upper open periphery to expand and said tube has at least a flexible section in the area adjacent the folds in the walls of said tank.

16. The combine as claimed in claim 9, wherein the pneumatic pressure supply includes a pump driven from said power unit.

17. The combine as claimed in claim 9, wherein said tube is oriented in a horizontal direction relative to said grain tank and near the upper open periphery for sensing when the grain tank is full.

18. The combine as claimed in claim 17, having a plurality of closed end tubes around the periphery, each of which having independent pressure sensors for indicating which of the tubes has grain accumulating over it.

19. A method of for determining the level of grain in a tank comprising:
- placing into the tank a closed end elongated tube having a plurality of spaced openings along a length of said closed end elongated tube;
- pressurizing the interior of the tube to a given level;
- sensing the interior pressure of the tube without grain in the tank;
- subsequently sensing the interior of said tube as grain accumulates within the tank; and
- comparing the subsequent pressure to the empty pressure as a measure of the grain within the tank.

20. The method as claimed in claim 19, further comprising the step of having a switch indicating the full level of grain within the said tank so as to calibrate the range of pressures as grain accumulates within the tank.

* * * * *